(12) United States Patent
Zakaria

(10) Patent No.: US 7,510,580 B2
(45) Date of Patent: Mar. 31, 2009

(54) METHOD AND APPARATUS TO ELIMINATE THEFT OF ELECTRONIC EQUIPMENT USING EXISTING TELEPHONE JACK

(76) Inventor: Ziad Zakaria, 3215 Kenilworth Drive, Windsor, Ontario (CA) N9E 4R1

( * ) Notice: Subject to any disclaimer, the term of this patent is extended or adjusted under 35 U.S.C. 154(b) by 623 days.

(21) Appl. No.: 10/717,650

(22) Filed: Nov. 21, 2003

(65) Prior Publication Data

US 2004/0230823 A1 Nov. 18, 2004

Related U.S. Application Data

(60) Provisional application No. 60/427,952, filed on Nov. 21, 2002.

(51) Int. Cl.
*G08B 13/14* (2006.01)
*G08B 29/16* (2006.01)
*H04M 11/04* (2006.01)

(52) U.S. Cl. .................. 726/35; 726/34; 380/258; 455/404.2; 340/825.49; 340/5.8

(58) Field of Classification Search ............. 380/258; 726/34, 35; 455/404.2; 340/825.49, 5.8
See application file for complete search history.

(56) References Cited

U.S. PATENT DOCUMENTS

| | | | | |
|---|---|---|---|---|
| 5,243,652 | A | * | 9/1993 | Teare et al. .................. 380/250 |
| 5,729,596 | A | * | 3/1998 | Reeder et al. ........... 379/102.04 |
| 5,802,280 | A | * | 9/1998 | Cotichini et al. ............ 709/200 |
| 5,805,055 | A | | 9/1998 | Colizza |
| 6,031,894 | A | * | 2/2000 | Fleming, III ................. 379/44 |
| 6,842,106 | B2 | * | 1/2005 | Hughes et al. ................ 340/5.8 |
| 7,193,504 | B2 | * | 3/2007 | Carrender et al. .......... 340/10.4 |
| 2002/0108058 | A1 | | 8/2002 | Iwamura |
| 2003/0204739 | A1 | * | 10/2003 | Ng et al. ..................... 713/194 |
| 2004/0056759 | A1 | * | 3/2004 | Ungs ......................... 340/5.74 |

FOREIGN PATENT DOCUMENTS

JP 2000101749 A2 4/2000

* cited by examiner

*Primary Examiner*—Michael J Simitoski
(74) *Attorney, Agent, or Firm*—John R. S. Orange; Blake, Cassels & Graydon LLP

(57) ABSTRACT

This invention provides a method and apparatus to eliminate the theft of various types of electronic equipment through the use of an existing telephonic connection. The method includes steps of determining an apparent theft, contacting a local police or security authority and providing a means of discovering the location of the stolen equipment. The method further allows the apparatus to eliminate the need for excessive hardware components by utilizing pre-existing infrastructure. In utilizing preexisting infrastructure, the invention allows operation in a plurality of locations through its standalone capabilities and location identification capabilities.

7 Claims, 3 Drawing Sheets

METHOD AND APPARATUS TO ELIMINATE THEFT OF ELECTRONIC EQUIPMENT USING EXISTING TELEPHONE JACK

This application claims priority from U.S. Provisional Application No. 60/427,952 filed on Nov. 21, 2002, the contents of which are incorporated herein by reference.

FIELD OF THE INVENTION

The present invention relates to methods and apparatus for inhibiting theft of electronic equipment.

BACKGROUND OF THE INVENTION

Electronic equipment found in offices and residential areas are valuable and therefore subject to theft. At present there exists a number of methods to inhibit the theft of electronic equipment. Traditionally, an anti-theft device will override the functioning of the equipment such as disrupting visual output or shutting down power as well as incorporate the use of an audible alarm upon detection of a theft. In many cases, the detection of theft in this manner does not aid in tracing the new location of the stolen equipment or in the identification of the apparent thieves.

In many existing anti-theft method and apparatus, the device itself requires that additional hardware be included to function properly. For example it is common to use added hardware needed to produce an audible alarm. Other devices such as that shown in US patent publication 2002/0108058 A1 to Iwamura, require a network to be present between the device being protected and a server, with this network further requiring a monitoring station to poll the protected devices. In addition, at present, electronic anti-theft devices override a device's operation or display requiring compatible software specific to the equipment being protected to control various functions of the equipment.

It is therefore an object of this invention to mitigate at least one of the above disadvantages in providing anti-theft protection to electronic equipment.

SUMMARY OF THE INVENTION

The present invention is based on the recognition that many modern electronic devices require connection to remote locations via telephone lines for the transfer of data and communication purposes.

The present invention provides a method and device to inhibit theft of electronic equipment using existing telephonic communication infrastructure. The device includes a microprocessor, which may be integrated into an electric circuit of the device to be protected, and a connection to a telecommunication module within the protected item that is used to communicate a message of apparent theft to an outside party. The microprocessor co-operates with the telecommunication module to transfer data indicative of the location of the device. From the data, a determination is made whether or not a theft has occurred.

Using the telephone connection, the method includes a set of steps in which it determines whether or not a theft has occurred and acts upon an indication of theft. In one embodiment, the steps include using an assigned password to configure the device to communicate wherein access allows the user to input the phone number that the protected device must be connected to for proper operation and the phone number of a security station or local police authority. Once set up, an automatic dialing of the equipment's own phone number occurs. The invention uses the response of this dialling in decision making. If the dialling results in a busy signal the device is in its proper location, if normal dialling occurs the device is no longer at its proper location and is therefore presumed stolen. If presumed stolen the second phone number is dialled to alert authorities of theft. To be executed upon dialling the second phone number, the device will access a pre-recorded message that is sent to the security station or police authority at the second phone number. The security station receives the message indicating that an apparent theft has occurred, and triggers a trace of the incoming call to detect the exact location of the stolen equipment. This exact location is used by the proper authority to retrieve the stolen equipment from the traced location.

Preferably, in addition to the above-mentioned steps, upon user input of the assigned Password, a change can be made in data stored to accommodate a change of ownership or location of the protected equipment.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
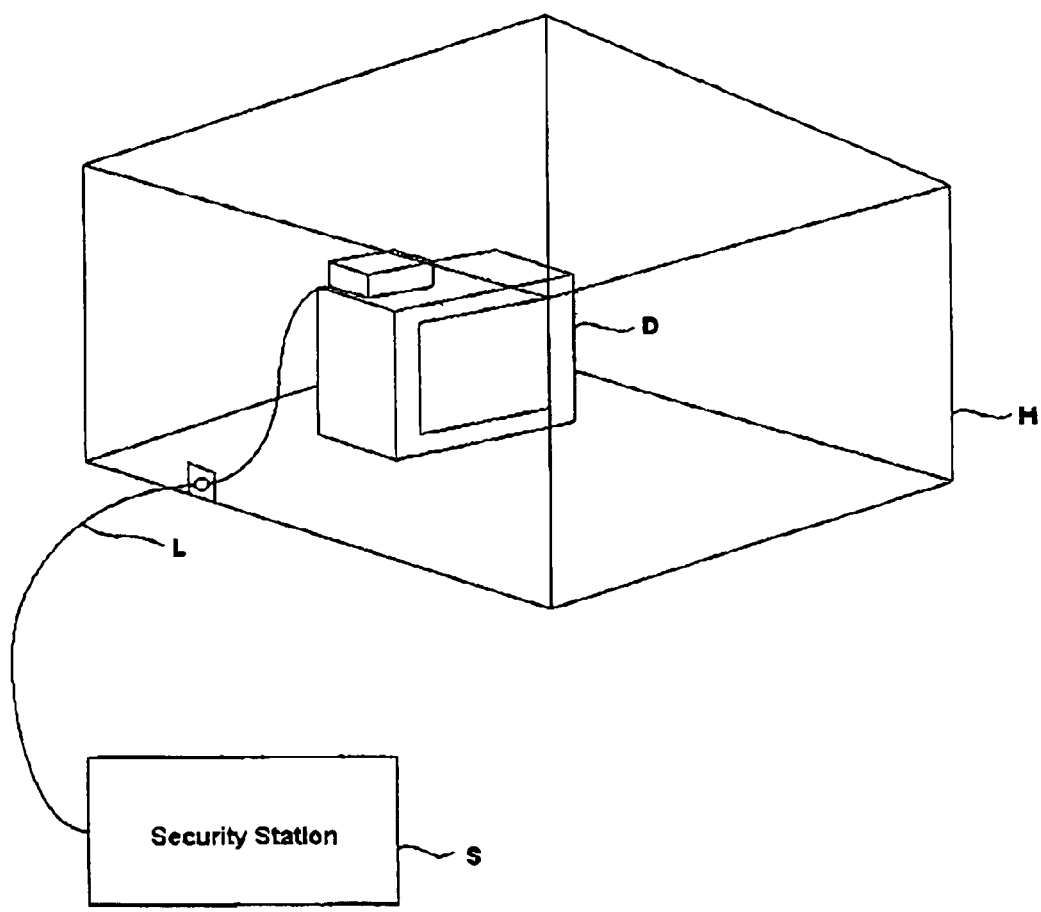
FIG. 1 shows schematically a residential installation.

Referring therefore to FIG. 1, an electronic component D, shown schematically as a television is located in a house H. The house H has an external phone line L, which through the existing infrastructure is connected to a security establishment S. It will be appreciated that the telephone link L may take any suitable form, including a wireless link or a cable connection.

Figure 2:
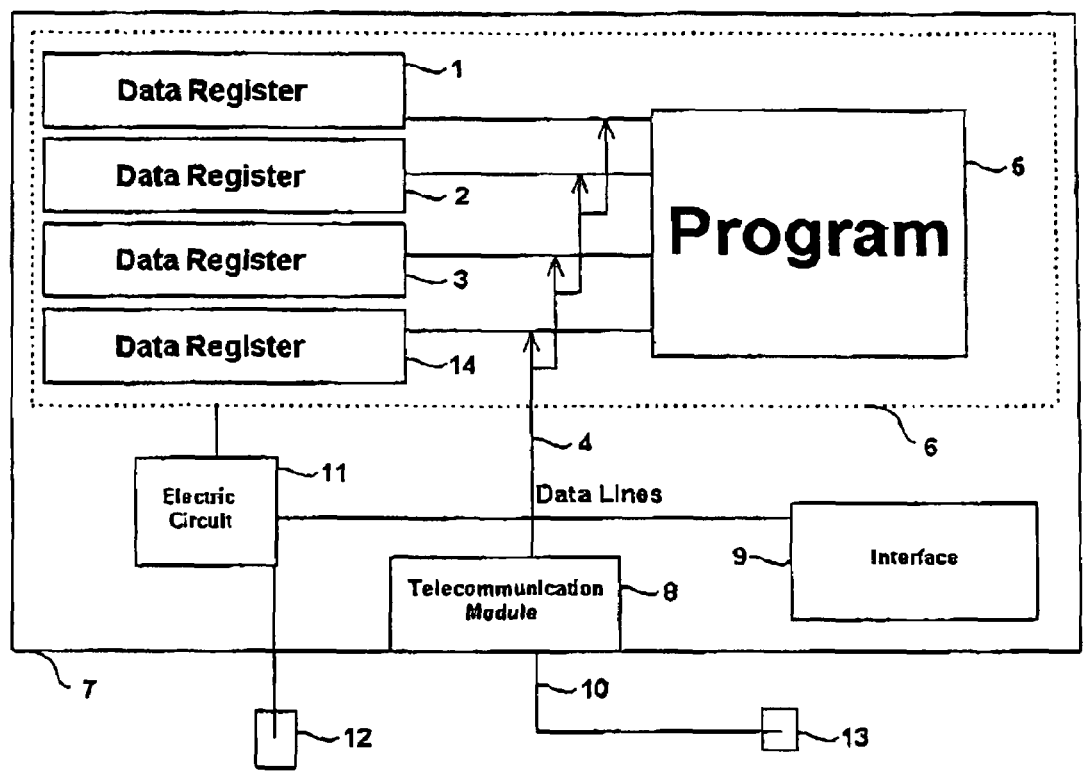
FIG. 2 shows a functional block diagram of the anti-theft device.

Referring to FIG. 2, an electronic component D includes an anti-theft device 7. The device 7 includes a microprocessor 6 that is connected to an electric circuit 11 of the electronic component 7. The microprocessor 6 is controlled by a software program 5, which communicates with the storage areas 1,2,3,14 via data lines 4. The storage areas typically in the form of data registers 1,2,3 contain information input by the user through an interface 9 and used to verify the operation of the component 7. The remaining storage area typically in the form of a data register 14 contains information pre-loaded into the anti-theft device 7. The program 5 also controls a telecommunication module 8, which communicates through a phone line 10 connected by an external jack 13 to the external phone line L. A connection to the external jack 13 via the phone line 10 must be accomplished for the device 7 to allow operation of the equipment D.

Figure 3:
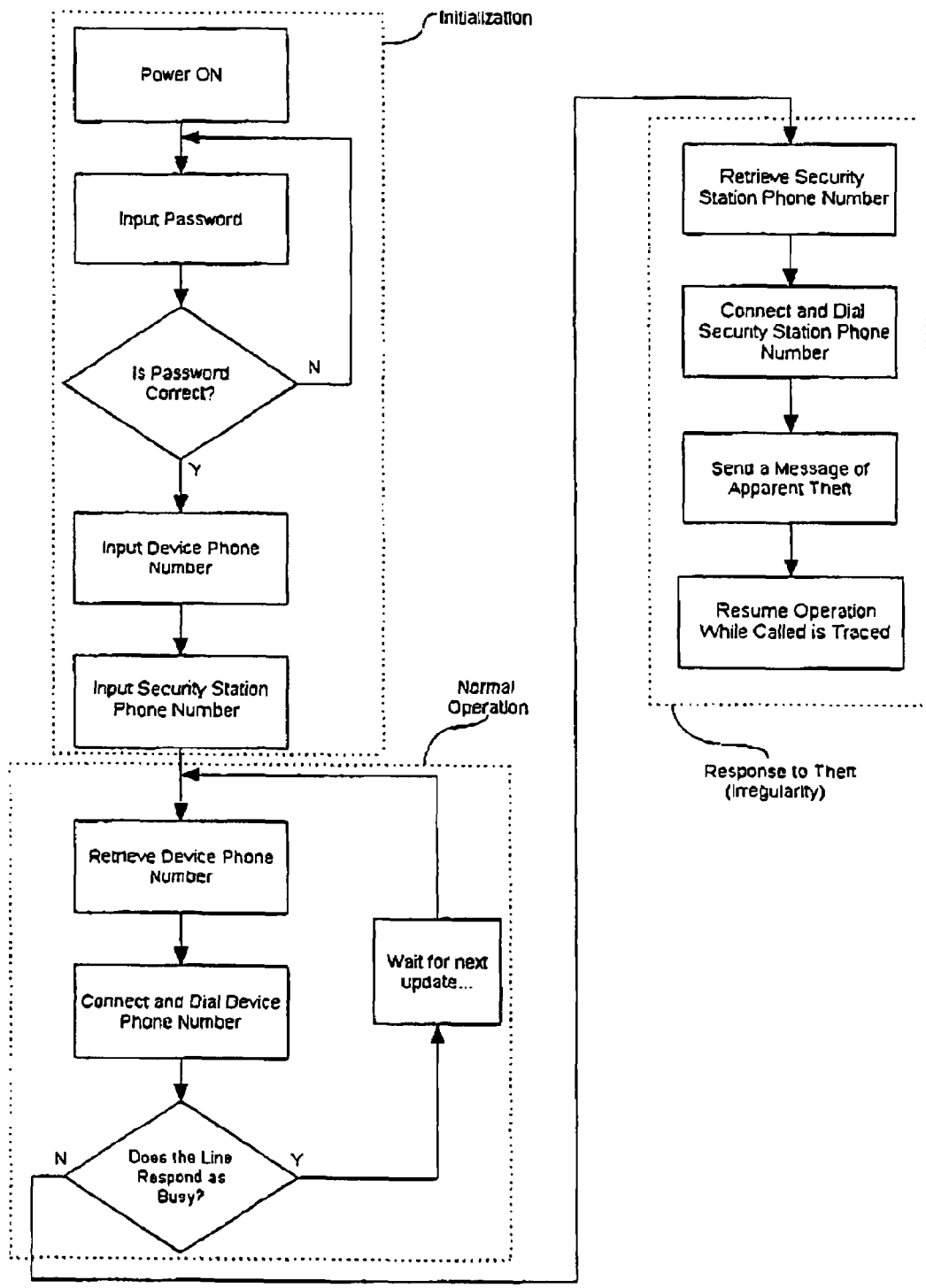
FIG. 3 is a flow chart indicating operation of the component of FIG. 2.

The microprocessor 6 is responsive to a connection of power to the circuit to initiate an authentication procedure shown in FIG. 3. Upon initial connection to a power supply and proper connection to an external jack 13, the microprocessor 6 prompts the user to input a password to data register 1. The register 1 may already be programmed to contain a password, in which case the user input is compared with the stored password, or may simply accept the initial input from the user and store it for future use. The interface then prompts the user for the phone number to which the device is connected, which it stores in register 2, and the phone number of a security or police service S which it stores in register 3.

Once the above initialization procedure is complete, the device 7 will resume normal operation unless prompted by the user via an interface 9 that the contents of data registers 2,3 are to be changed. This normal operation will occur upon subsequent connections of the component to a power supply, after an interruption in power, provided the equipment D has been properly connected to the external jack 13. This ensures that in the event of a theft, the device 7 is capable of detecting, the theft by continuing its normal operation while inhibiting a thief from changing the contents of data register 2 to the phone number of the new unauthorized location. Data register 1 can be accessed for comparison to a password input via an interface 9 in the event that the equipment being protected D lawfully changes locations or owners.

Again with reference to FIG. 2, the software program 5 further to accessing the four data registers 1,2,3,14, communicates with the telecommunication module 8 of the protected equipment 7. The software program 5 using a timer, accesses the data lines 4 every thirty to sixty minutes first reading the contents of data register 2. It next sends this information via the data lines 4 to the equipment's telecommunication module 8 with instructions to dial the phone number via the telephone line 10 connected to an external jack 13. The data lines 4 receive the response of the dialling attempt through the telecommunication module 8 and carry this information back to the microprocessor 6, for the software program 5 to interpret the response.

Data register 2 containing the home phone number of the equipment to be protected D is utilised during normal operation. The software program 5 during intermittent security updates uses the information stored in register 2 to dial the number stored in data register 2 using the telecommunications module 8 and uses the response of this action to determine whether a theft has occurred. If the response is a "busy" signal, this indicates the security device 7 is connected to the proper telephone jack 13. If the signal dials and begins to ring, the equipment D is presumed to be stolen as it is not connected to the proper external jack 13. If stolen, the software program 5 accesses the contents of data register 3 and the pre-recorded message in data register 14.

Data register 3 is designated to contain the phone number of the local police or security authority S. When the software program's 5 logic has determined a theft has occurred the software program 5 accesses its pre-recorded message 14 and the phone number stored in data register 3 and transfers these via the data lines 4 to the telecommunications module 8, where it is used to dial the assigned security organization S.

According to the logic explained above, if the response is interpreted as a theft, the software program 5 uses the data lines 4 to transfer the contents of data register 3 and the pre-recorded message 14 back to the telecommunication module 8 to be dialled. The telecommunication module 8 dials the number and sends the pre-recorded message 14 to the security station S. The security station S receives the pre-recorded message 14, which determines that an apparent theft has occurred and a trace begins on the incoming call. Once this operation is complete, the location of the stolen equipment D can be determined by the security organization S and passed on to the proper authority to retrieve the equipment D using the call placed via the telephone line 10 connected to an external jack 13. It can be appreciated that the device 7 may contact the police authority directly with its pre-recorded message 14, if a security organization S is not used.

Further to the above embodiments, again referring to FIG. 2, the software program 5 allows for manipulation of data register 2 and data register 3 in the event of change of ownership or location. When the microprocessor 6 receives input of its password via the data lines 4 and through an interface 9, the software program 5 compares this input to the contents of data register 1. If access is granted, the software program 5 allows the user to change the phone numbers stored in the above mentioned data registers 2,3 to prevent false alarms when the location of the protected equipment 7 is lawfully changed. Furthermore, it is required that a proper connection to an external jack 13 be made for the equipment being protected 7 to operate. This feature ensures that the device 6 will be able to properly detect a theft.

Although the invention has been described with reference to certain specific embodiments, various modifications thereof will be apparent to those skilled in the art without departing from the spirit and scope or the invention as outlined in the claims appended hereto.

The invention claimed is:

1. An antitheft device for use in portable electronic equipment comprising a microprocessor and a communication module for connection to an external communication network, said microprocessor including a telephone number indicative of the location of said electronic equipment, an output to provide said telephone number to said communication module and a comparator to compare a response from said communication module to a predetermined response and thereby determine whether said equipment is in a desired location; wherein said predetermined response is a busy signal from the external communication network.

2. An antitheft device according to claim 1 wherein upon receipt of a response other than said predetermined response said microprocessor utilizes additional data with said external communication network to indicate a theft of said equipment.

3. An antitheft device according to claim 2 wherein said additional data is a telephone number of a security authority.

4. An antitheft device for use in portable electronic equipment comprising a microprocessor and a communication module for connection to an external communication network, said microprocessor including data indicative of the location of said electronic equipment, an output to provide said data to said communication module and a comparator to compare a response from said communication module to a predetermined response and thereby determine whether said equipment is in a desired location; said antitheft device further comprising user-accessible software allowing said data indicative of the location of said electronic equipment to be modified by a privileged user.

5. A method of detecting the theft of portable electronic equipment using an antitheft device associated with the portable electronic equipment, the method comprising the steps of:

(a) providing data indicative of a desired location of said electronic equipment to an external communication network, from said antitheft device;

(b) comparing a response from said external communication network to a predetermined response;

(c) acknowledging the removal of said electronic equipment from said desired location if said response from the external communication network differs from said predetermined response; and (d) sending additional data to said external communication network indicating the theft of said electronic equipment if said response from said external communication network differs from said predetermined response;

wherein said additional data also includes data for determining the present location of said electronic equipment.

6. A method of detecting the theft of portable electronic equipment using an antitheft device associated with the portable electronic equipment, the method comprising the steps of:
 a providing data indicative of a desired location of said electronic equipment to an external communication network, from said antitheft device;
 (b) comparing a response from said external communication network to a predetermined response;
 (c) acknowledging the removal of said electronic equipment from said desired location if said response from the external communication network differs from said predetermined response; and
 (d) modifying the desired location of said electronic equipment whenever prompted by a privileged user.

7. The method of claim 5 wherein steps (a) to (d) are repeated on a periodic basis.

* * * * *